Sept. 22, 1931.  A. E. SHINN  1,824,376
BEET HARVESTER
Filed April 16, 1928   3 Sheets-Sheet 2
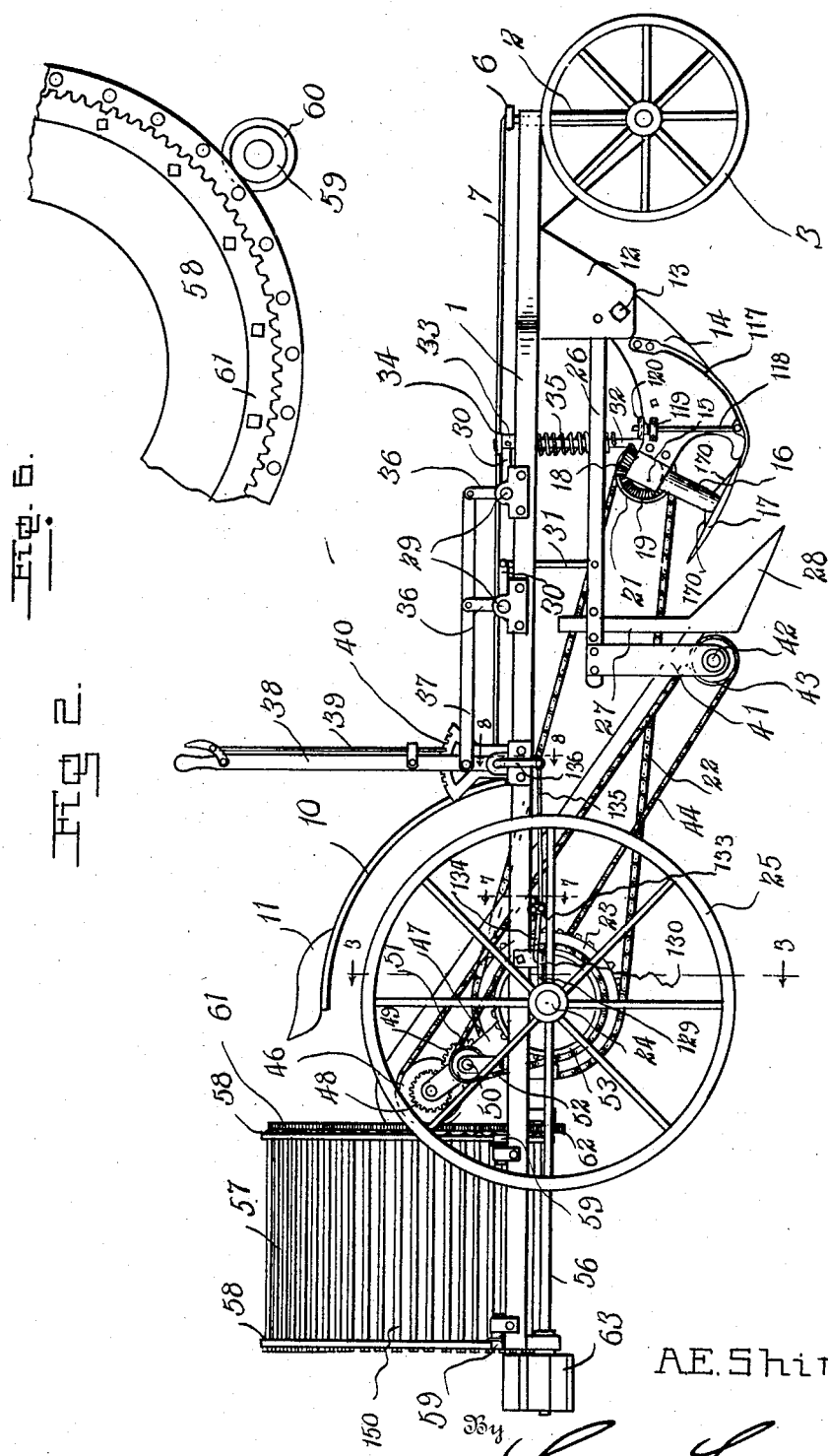
Inventor
A.E.Shinn
By Lacey & Lacey, Attorneys

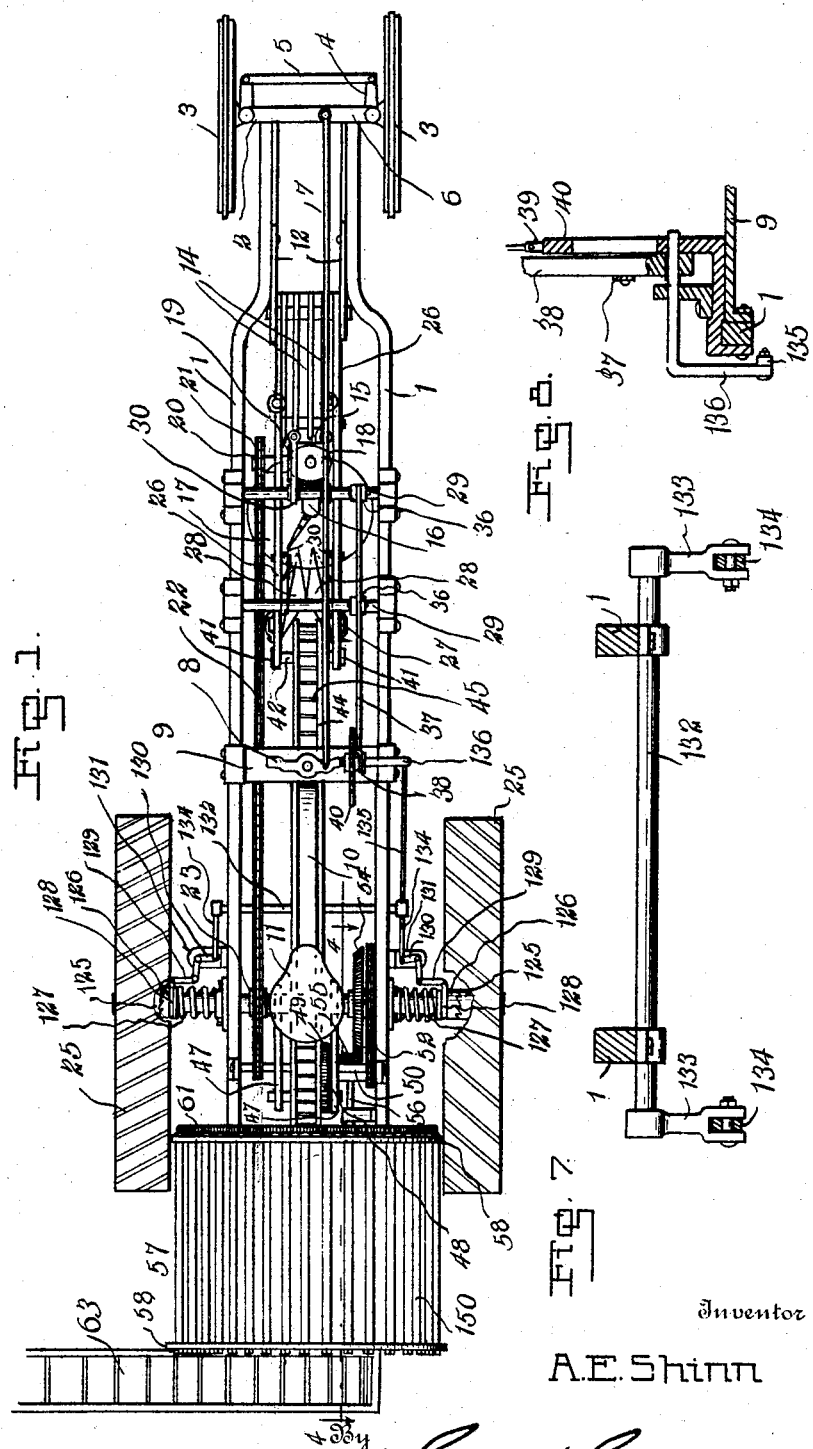

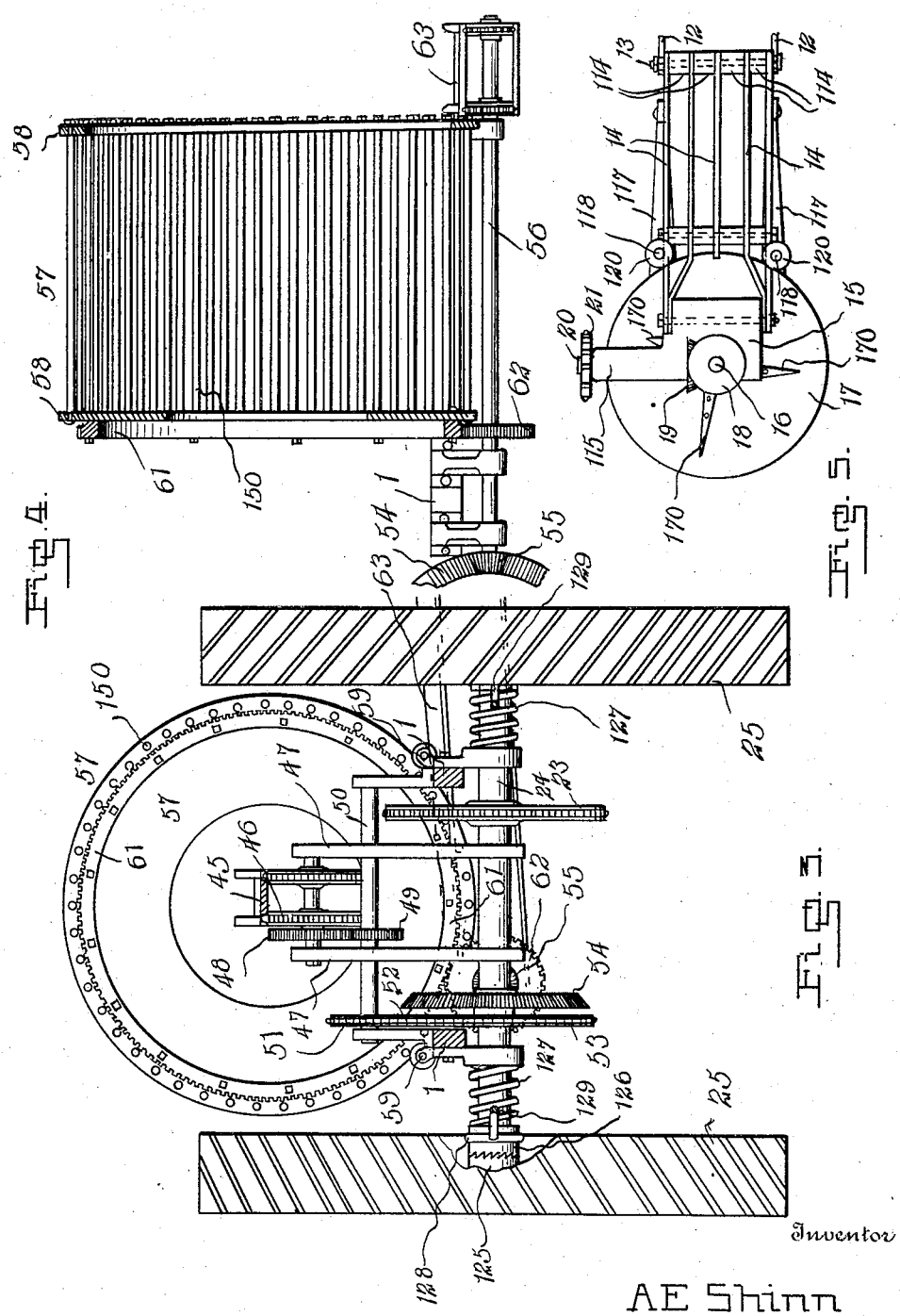

Patented Sept. 22, 1931

1,824,376

UNITED STATES PATENT OFFICE

ALBERT E. SHINN, OF EAST LAS VEGAS, NEW MEXICO

BEET HARVESTER

Application filed April 16, 1928. Serial No. 270,410.

This invention is a machine for removing the tops of beets, lifting the beets from the ground and subsequently transferring them to a wagon driven alongside the machine. The invention has for its object the provision of simple means which will operate continuously as the machine is drawn along a row of beets to cut off the tops of beets at a uniform height and automatically accommodate itself to pass over beets of abnormal size. The invention also has for its object the provision of simple means which are actuated by the ground wheels of the machine to lift the beets from the ground and transfer them to a drum in which they will be relieved of dirt clinging to them and then deposited upon a conveyor by which they are transferred to a vehicle traveling alongside the machine. The invention is illustrated in the accompanying drawings and will be hereinafter fully set forth.

In the drawings:

Figure 1 is a plan view of a beet harvester embodying the invention;

Fig. 2 is a side elevation of the same;

Fig. 3 is an enlarged tranverse section on the line 3—3 of Fig. 2;

Fig. 4 is a detail section on the line 4—4 of Fig. 1;

Fig. 5 is a detail plan view of the topper and the parts immediately associated therewith;

Fig. 6 is a detail of a portion of the drum;

Fig. 7 is a detail section on the line 7—7 of Fig. 2, and

Fig. 8 is a detail section on the line 8—8 of Fig. 2.

The main frame of the machine comprises sills or side bars 1 which are secured at their front ends upon an arch 2 which carries the front wheels 3, said wheels being mounted upon stud axles pivoted upon the sides of the arch and having forwardly projecting steering arms or spindles 4 connected by a link 5. One spindle is extended vertically to project above the arch and at its upper end is provided with an inwardly projecting crank 6 to which is attached the front end of a steering rod 7 which extends rearwardly to be attached to a foot rest 8, said foot rest being pivotally mounted midway its ends upon a cross bar 9 which is secured to and extends between the cross bars 1, as clearly shown in Fig. 1. A seat standard 10 is secured to said cross bar and carries a seat 11 for the driver who may place his feet upon the foot rest 8 and by pressing either end of the same forwardly will turn the wheels 3 to one side so as to steer the machine in an obvious manner. The machine may be drawn along a row of beets by a tractor or by draft animals as may be most convenient under any given circumstances.

Secured to and depending from the side bars 1 near but in rear of the front ends thereof are brackets 12 and carried by the lower ends of these brackets is a pivot rod 13 upon which are hung runners 14, spacers 114 being fitted on the pivot between the runners, as will be understood. The lower ends of these runners rest upon the surface of the ground and are adapted to ride over the tops of the beets so that the runners will be automatically raised and lowered according to the sizes of the beets. A bearing bracket 15 is carried by the upper rear corners of the runners, and in this bracket is journaled a shaft 16, to the lower end of which is secured a cutting disk 17, it being noted that the shaft is disposed obliquely and the cutter has its most advanced point disposed immediately under the lower rear extremities of the runners so that it will cut through the tops of the beets immediately adjacent the same and, therefore, the beets will be cut at a uniform distance below the crowns so that all of the tops will be removed. Radial ribs or wings 170 on the upper side of the topping disk serve to thrust aside the cut tops so that they will not clog the action of any parts. Above the bearing bracket 15, a beveled pinion 18 is secured upon the shaft 16, and this pinion meshes with a gear 19 carried by the inner end of a shaft 20 which is disposed transversely and journaled in a lateral arm 115 of the bracket 15. Upon the outer end of the shaft 20 is a sprocket 21 about which is trained a sprocket chain 22 which is also trained about a driving sprocket 23 secured upon the rear axle 24. The axle 24 is mounted in suitable bearings upon the side bars 1 and carries the rear ground wheels 25 which constitute the driving wheels. It will now be seen that as the machine is drawn forward the driving sprocket 23 will be rotated, and this rotation will be transmitted to the sprocket 21 and thence through the shaft 20 and the described gearing to rotate the cutting disk 17.

Fastened at their front ends to the outer sides of the runners are guards 117, the purpose of which is to prevent the topping disk digging into the ground as it passes from a beet. These guards are leaf springs closely following the contour of the lower edges of the runners and having their lower free ends disposed under the topping disk. Pivoted to each guard near the free end thereof is a hanger rod 118 which extends upwardly through a guide 119 on the side of the runners and has its upper extremity threaded, a set nut 120 being fitted on the threaded end of the rod above the guide whereby the spring guard may be adjusted in an obvious manner as may be desired.

Pivotally mounted upon and between the brackets 12 are plow beams 26 which extend rearwardly beyond the gears 18 and 19 and have plow standards 27 secured thereto near their rear ends, plows or beet-lifting shares 28 being carried by the lower ends of the standards to travel at opposite sides of the row of beets and below the ground surface. The opposed edges of these shares converge rearwardly and the shares taper forwardly to points so that they will readily pass through the ground and by engaging opposite sides of the beet bodies below the tops thereof will lift the beets from the ground. Mounted upon the main frame, above the beet lifters, are rock shafts 29, and to each of these shafts are secured normally forwardly projecting cranks 30, the rear cranks being connected by links 31 with the rear ends of the respective plow beams 26 while the forward cranks are connected by links 32 with the rear ends of the runners 14 and the bearing bracket carried by said runners. Each link 32 passes upwardly through an eye 33 at the front end of the cooperating crank and is equipped above the same with a stop collar or nut 34 whereby it is prevented from dropping through the eye while a spring 35, coiled around the link with its upper end bearing against the eye 33 and its lower end attached to the link, yieldably holds the runners and the cutter depressed while permitting them a limited vertical movement in the event that they encounter an abnormally high beet. Cranks 36 rise from the rock shafts 29 and are connected by a rod 37, the rear end of which is pivoted to a hand lever 38 mounted upon the cross bar 9 within convenient reach of the driver and equipped with a latch 39 cooperating with a holding rack 40 in a well-known manner. By properly setting the hand lever, the plows or lifters, the cutter and the runners may be adjusted to run at a normal uniform depth and the machine thus set to operate at a given height with respect to the surface of the ground.

Hangers 41 are secured to and depend from the rear ends of the beams 26 and have journaled in their lower ends a shaft 42 carrying a roller or drum and sprocket wheels, indicated at 43, about which is trained an endless chain 44 which constitutes the driving element of an elevator apron 45 extending upwardly and rearwardly to a point above the rear axle 24 and rearwardly beyond the same. The upper rear bight of this elevator is carried by a drum or sprockets 46 supported by arms or brackets 47 fitted about the axle 24 and extending upwardly and rearwardly therefrom, as shown. Upon the axle of the drum or sprockets 46 is mounted a spur gear or pinion 48 which meshes with a similar pinion 49 carried by a transverse shaft 50 which is equipped with a sprocket pinion 51 on one end, a chain 52 being trained around said sprocket pinion and around a sprocket gear 53 which is secured upon the axle 24. By this mechanism, the elevator 45 is also driven directly by the rear axle. It is also to be noted that the front end of the elevator is adjusted vertically with the beet lifters so that it will always be in the same relation to the lifters and when the lifters and topping disk are raised from the ground, in turning the machine, the elevator will also be raised.

At the inner side of the sprocket 53, a beveled gear 54 is secured upon the axle to mesh with a beveled pinion 55 secured upon the front end of a shaft 56 which is journaled in suitable bearings depending from the main frame and extends beyond the rear end of the frame. Supported by the rear end of the main frame is a drum 57, each end of which is an annulus 58 having its outer peripheral edge arranged to ride upon rollers 59 mounted upon the sides of the frame and having flanges 60 to engage the opposed edges of the tracks 58 and thereby support the drum for rotation and prevent endwise movement thereof. At the forward end of the drum, there is secured thereto a ring gear 61 meshing with a spur pinion 62 secured upon the shaft 56 so that the rotation of said shaft will be imparted directly to the drum and the drum will be rotated to agitate the beets delivered into the same and shake therefrom all sand or other earthy matter which may be clinging thereto. It will be understood that the upper bight of the conveyer 45 is so disposed that the beet bodies carried upwardly by the elevator will be delivered into the drum. The central opening through the forward annulus is of less diameter than the opening through the rear annulus so that, while the beet bodies may readily enter the drum through its front end, they can escape only through the rear end. The circumferential wall of the drum consists of spaced rods 150 parallel with the axis of the drum and having their ends secured in the annuli 58, any preferred means, such as shoulders on the rods or spacer sleeves fitted upon the rods, being provided to maintain the spaced relation of the annuli. The beet bodies will, of course, tend to accumulate at the lowest point of the drum but, as the drum rotates continuously, they will be constantly tumbled about and tend to ride up with the moving side of the drum, the tumbling of the beets causing the sand and loose dirt thereon to drop therefrom and pass out through the spaces between the rods. As the beets reach high points of the drum, they will fall out through the rear end thereof. At the rear of the drum is an endless belt conveyer 63 which is supported by the side bars of the main frame and has the drum or roller supporting its inner bight secured upon the shaft 56 and driven directly by the same. This conveyer 63 may pass to any desired extent laterally beyond the side of the beet harvester so that the beet bodies deposited upon the conveyer will be transferred to a wagon traveling alongside the harvester. It will be understood, of course, that the conveyer is arranged close to the rear end of the drum so that the beet bodies which issue from the drum will be caught by the conveyer.

The rear wheels 25 are loose upon the axle 24 while the inner ends of their hubs are formed into ratchet clutch members 125 mating with clutch members 126 slidably fitted on the axle but constrained to rotate therewith and yieldably held to the members 125 by expansion springs 127 coiled around the axle between the axle bearings and the clutch members. The inner clutch members are formed with annular grooves in which are engaged forks 128 having inwardly extending arms 129, the ends of which are pivoted to angle levers 130 fulcrumed on brackets 131 on the main frame in front of the axle. Journaled upon the frame in advance of the brackets 131 is a transverse rock shaft 132 having cranks 133 at its ends with which the angle levers 130 are connected by links 134. A connecting rod 135 extends forward from one crank 133 to a crank 136 on the outer end of the pivot to which the hand lever 38 is secured, the clutches being thus connected so that when the topper and lifters are raised the machine will be thrown out of gear. If, however, the machine is to continue in operation although deviating from a straight path, the ratchet clutches will automatically accommodate the different speeds of the wheels 25 in passing curves.

From the foregoing description, taken in connection with the accompanying drawings, it will be seen that I have provided an exceedingly compact machine which will have comparatively light draft and by which, as the machine is drawn along a row of beets, the beet tops will be cut away and the beets lifted from the ground and passed rearwardly to be eventually delivered into a traveling receptacle.

Having thus described the invention, I claim:

1. A beet harvester comprising a traveling frame, means carried by the frame for topping and lifting the beets, an elevator having its front portion disposed immediately at the rear of the topping and lifting means to receive beet bodies therefrom, a drum rotatably mounted upon the frame at the rear end thereof with its axis extending longitudinally of the frame and consisting of two annuli and spaced rods connecting the same, the inner diameter of the front annulus being less than the inner diameter of the rear annulus, the upper rear portion of the elevator being arranged adjacent the drum to deliver the beet bodies directly into the same, a rear axle, and means driven by the rear axle for actuating the elevator and rotating the drum.

2. A beet harvester comprising a wheel-supported frame, means carried by the frame for topping and lifting the beet bodies, an endless elevator extending upwardly and rearwardly from the topping and lifting means, a drum supported by rollers on the frame at the rear end thereof with its axis extending longitudinally of the frame and having a ring gear on its front end, the elevator discharging directly into the drum through the front end thereof, means whereby the rear wheels supporting the frame will actuate the elevator and the topping and lifting means, a shaft driven by said wheels and extending under and beyond the drum, a pinion on said shaft meshing with the ring gear on the drum, and a conveyer at the rear of the drum driven by said shaft.

In testimony whereof I affix my signature.

ALBERT E. SHINN. [L. S.]